United States Patent
Rocktäschel

(10) Patent No.: US 11,161,784 B2
(45) Date of Patent: Nov. 2, 2021

(54) MATERIAL AND PRODUCTION THEREOF FOR USE AS A STORAGE MEDIUM IN A SENSITIVE ENERGY STORAGE SYSTEM IN THE LOW-, MEDIUM- OR HIGH-TEMPERATURE RANGE

(71) Applicant: Fluorchemie GMBH Frankfurt, Bergheim (DE)

(72) Inventor: Christian Rocktäschel, Bergheim (DE)

(73) Assignee: Fluorchemie GmbH Frankfurt, Bergheim (DE)

( * ) Notice: Subject to any disclaimer, the term of this patent is extended or adjusted under 35 U.S.C. 154(b) by 0 days.

(21) Appl. No.: 16/489,725

(22) PCT Filed: Sep. 1, 2017

(86) PCT No.: PCT/EP2017/072012
§ 371 (c)(1),
(2) Date: Aug. 29, 2019

(87) PCT Pub. No.: WO2018/157954
PCT Pub. Date: Sep. 7, 2018

(65) Prior Publication Data
US 2020/0010364 A1    Jan. 9, 2020

(30) Foreign Application Priority Data

Mar. 1, 2017   (WO) ................. PCT/EP2017/054767

(51) Int. Cl.
*C04B 18/00*   (2006.01)
*C04B 18/04*   (2006.01)
(Continued)

(52) U.S. Cl.
CPC ........ *C04B 18/0409* (2013.01); *C04B 14/041* (2013.01); *C04B 14/06* (2013.01);
(Continued)

(58) Field of Classification Search
CPC ..... C04B 18/00; C04B 18/0409; C04B 18/02; C09K 5/00; C09K 5/08; C09K 5/14
(Continued)

(56) References Cited

U.S. PATENT DOCUMENTS 3,886,245 A * 5/1975 Bayer ................. C04B 33/1322
                                                                264/638
4,133,866 A    1/1979 Lakatos et al.
(Continued)

FOREIGN PATENT DOCUMENTS

CN       102070815      5/2011
EP        794161        9/1997
(Continued)

OTHER PUBLICATIONS

Ерошкина, H.A. et al., "Геополимерные строительные материалы на основе промыш- ленных отходов: моногр.", Пенза: ПГУАС, 2014, 2014, ISBN 978-5-9282-1221-6.
(Continued)

*Primary Examiner* — Jane L Stanley
(74) *Attorney, Agent, or Firm* — Ziolkowski Patent Solutions Group, SC

(57) ABSTRACT

The present invention relates to a modified red mud/a modified bauxite residue and also to processes for the production thereof and to a storage medium comprising a modified red mud, to a heat storage means comprising a storage medium and to numerous uses of a modified red mud as storage medium, in particular in a heat storage means. The modified red mud contains the following components: haematite ($Fe_2O_3$), —corundum ($Al_2O_3$), —rutile ($TiO_2$) and/or anatase ($TiO_2$), —quartz ($SiO_2$), —optionally perowskite ($CaTiO_3$) and —optionally pseudobrookite (($Fe^{3+}$,$Fe^{2+}$)$_2$(Ti, $Fe^{3+}$)$O_5$), nepheline ((Na,K)[$AlSiO_4$]) and/or hauynite ((Na, Ca)$_{4-8}$[$Al_6Si_6O_{24}$($SO_4$)]), wherein the modified red mud is
(Continued)

substantially free from Na$_2$O and/or glass. A novel material is thus provided, and the production thereof for use as a storage medium in a sensitive energy storage system in the low-, medium- or high-temperature range is described.

21 Claims, 2 Drawing Sheets

(51) Int. Cl.

| | |
|---|---|
| C04B 40/00 | (2006.01) |
| C04B 20/10 | (2006.01) |
| C04B 28/00 | (2006.01) |
| C04B 18/02 | (2006.01) |
| C09K 8/03 | (2006.01) |
| C04B 28/06 | (2006.01) |
| C04B 28/26 | (2006.01) |
| C04B 14/04 | (2006.01) |
| C04B 14/06 | (2006.01) |
| C04B 14/30 | (2006.01) |
| C04B 111/10 | (2006.01) |
| C04B 111/28 | (2006.01) |
| C04B 111/54 | (2006.01) |
| C04B 103/00 | (2006.01) |
| C04B 111/00 | (2006.01) |
| C04B 111/52 | (2006.01) |

(52) U.S. Cl.
CPC .......... *C04B 14/303* (2013.01); *C04B 14/308* (2013.01); *C04B 18/023* (2013.01); *C04B 20/1018* (2013.01); *C04B 20/1055* (2013.01); *C04B 20/1066* (2013.01); *C04B 28/006* (2013.01); *C04B 28/06* (2013.01); *C04B 28/26* (2013.01); *C04B 40/0042* (2013.01); *C09K 8/032* (2013.01); *C04B 2103/0094* (2013.01); *C04B 2103/0096* (2013.01); *C04B 2111/00258* (2013.01); *C04B 2111/00758* (2013.01); *C04B 2111/00862* (2013.01); *C04B 2111/1075* (2013.01); *C04B 2111/28* (2013.01); *C04B 2111/52* (2013.01); *C04B 2111/54* (2013.01); *Y02P 40/10* (2015.11); *Y02W 30/91* (2015.05)

(58) Field of Classification Search
USPC .......................................................... 252/71
See application file for complete search history.

(56) References Cited

U.S. PATENT DOCUMENTS

| | | | | |
|---|---|---|---|---|
| 5,043,077 | A * | 8/1991 | Chandler | .................. B09B 1/00 |
| | | | | 210/698 |
| 9,297,590 | B2 | 3/2016 | Watremetz et al. | |
| 9,487,636 | B2 | 11/2016 | Rocktaschel et al. | |
| 10,107,563 | B2 | 10/2018 | Bergan | |
| 2013/0263758 | A1 | 10/2013 | Skoda et al. | |
| 2013/0345351 | A1 | 12/2013 | Rocktaschel et al. | |
| 2014/0158318 | A1 * | 6/2014 | Watremetz | .............. F28D 17/02 |
| | | | | 165/10 |
| 2014/0352912 | A1 * | 12/2014 | Francy | .................... F28F 19/02 |
| | | | | 165/10 |
| 2015/0086449 | A1 * | 3/2015 | Sugita | ....................... C22B 3/44 |
| | | | | 423/21.1 |
| 2015/0353831 | A1 | 12/2015 | Rocktaschel | |
| 2016/0068436 | A1 * | 3/2016 | De Noni Junior | .... C04B 18/023 |
| | | | | 106/405 |
| 2018/0106195 | A1 * | 4/2018 | Stevanovic | ............... F02C 6/14 |

FOREIGN PATENT DOCUMENTS

| | | | | |
|---|---|---|---|---|
| RU | | 2179590 C1 | 2/2002 | |
| SU | | 937107 | 6/1982 | |
| WO | | 2014114283 | 7/2014 | |
| WO | WO 2016/165724 | A1 * | 10/2016 | ............... F02C 1/05 |
| WO | | 2017157664 | 9/2017 | |

OTHER PUBLICATIONS

Rivas Mercury et al., "Thermal Behavior and Evolution of the Mineral Phases of Brazilian Red Mud," Journal of Thermal Analysis and Calorimetry, May 2011, vol. 104, pp. 635-643.

Di San Filippo et al., "Recycling of Red Mud from the Bayer Process, Part 2—Production of Vitrified Clayware at a Firing Temperature of over 1000 degrees C," Ziegelindustrie International, 1980, vol. 41, No. 4, pp. 133-139.

Zhang et al., "Early-Age Characteristics of Red Mud—Coal Gangue Cementitious Material," Journal of Hazardous Materials, 2009, vol. 167, pp. 927-932.

Feret, "Selected Applications of Rietveld-XRD Analysis for Raw Materials of the Aluminum Industry," Powder Diffraction, Jun. 2013, vol. 28, No. 2, pp. 112-123.

Sglavo et al., "Bauxite 'Red Mud' in the Ceramic Industry, Part 1: Thermal Behaviour," Journal of the European Ceramic Soci, Elsevier Science Publishers, Barking, Essex, GB, vol. 20, No. 3, Mar. 1, 2000, pp. 235-244.

Yalcin et al, "Utilization of Bauxite Waste in Ceramic Glazes," Ceramics Internatio, Elsevier, Amsterdam, NL, vol. 26, No. 5, Jun. 16, 2000, pp. 485-493.

Lopez et al., "Adsorbent Properties of Red Mud and Its Use for Wastewater Treatment," Water Research, Elsevier, Amsterdam, NL, vol. 32, No. 4, Apr. 1, 1998, pp. 1314-1322.

Xiaolan et al., "Effects of Modification and Calcination Conditions on the Adsorption Performance of Red Mud for Low-Concentration Formaldehyde in Air," Environment Protection Engineering, Dec. 31, 2013, vol. 39, pp. 47-57.

Ye et al., "Synthesis and Characterization of Geopolymer from Bayer Red Mud with Thermal Pretreatment," Journal of the American Ceramic Society, vol. 97, No. 5, May 4, 2014, pp. 1652-1660.

\* cited by examiner

MATERIAL AND PRODUCTION THEREOF FOR USE AS A STORAGE MEDIUM IN A SENSITIVE ENERGY STORAGE SYSTEM IN THE LOW-, MEDIUM- OR HIGH-TEMPERATURE RANGE

The present invention relates to a modified red mud or a modified bauxite residue, hereafter also referred to as ALFERROCK®, and also to methods for the production thereof and uses thereof.

With the Renewable Energy Act (EEG) Germany has established that nuclear power and coal-fired power generation will be phased out by 2038. As substitutes, wind farms, solar installations and biogas installations should constitute the power supply for Germany.

In particular, however, wind farms and solar installations have the disadvantage that in still air and in darkness no power is generated. Thus these renewable energy sources are not capable of providing base load power for customers, in particular industrial customers, who are dependent upon a consistent power supply.

In order to avoid this systemic disadvantage, power generation and power consumption must be separated. Only energy accumulators which are connected between the power generators and the power consumers make it possible to provide a consistent power flow in the necessary manner and thus to make the renewable energy sources capable of providing base load power.

Therefore there is a demand for energy accumulators and suitable storage media therefor which can remedy these disadvantages in the production of power from renewable power sources and which can themselves also be obtained in a cost-effective manner which conserves resources.

It is known that red mud is produced as a waste product in the Bayer process for extracting aluminium hydroxide (ATH) from bauxite. In the following description red mud (RM) is understood to be the residue from the Bayer process which is produced in the extraction of ATH from bauxite. A large proportion of the bauxite residue or red mud produced in the extraction of aluminium is not further processed and put to an economically viable use, but is disposed of at disposal sites.

From the prior art it is already known that bauxite residue is suitable as an adsorbent because of its large internal surface.

Furthermore it is known that, because of its chemical composition, modified bauxite residue can be used as an inorganic, halogen-free flame retardant in plastics of all types, which are provided as a compound or also in foamed form (WO 2012/126487 A1).

Furthermore it is known that modified bauxite residue has a high density, so that this composition can also be used as soundproofing means or for drilling mud weighting or for shielding against radiation (WO 2014/114283 A1).

Furthermore, a porous, particulate material comprising bauxite residue for fluid treatment and removal of pollutants is known from WO 2005/061408 A1. The pollutants include, for example, heavy metals, anions and gases.

In experiments with modified, chromate-deficient bauxite residue which has been heated to temperatures between 120° C. and 250° C. the present inventors surprisingly found that the cooling took place unexpectedly slowly. In the light of this observation the inventors of the present invention carried out comprehensive studies on the behaviour of (optionally chromate-deficient) bauxite residue or red mud, when it is subjected to a thermal treatment, and in this case made observations by comparing the chemical, mineralogical, physical and mechanical parameters, in particular the thermal parameters. Thus the inventors arrived at a new type of modified red mud which can be used as a storage medium, in particular as a heat storage means.

The thermal treatment influences the aforementioned parameters in a crucial way and thus has a significant influence on the characteristics of the heat storage means overall, wherein in particular its behaviour during cyclical exposure to heat (thermal cycling stability, thermal shock resistance) is important. On the basis of the chemical composition of the red mud used as starting material and the temperature ranges which were run through during the thermal treatment, different chemical/mineralogical species can ensue in each case, which in turn have different chemical, physical, mineralogical, mechanical and thermal characteristics. The sum of these characteristics determine the characteristics of the storage mechanism. This makes it possible to influence the characteristics of the storage mechanism in any form, i.e. in a targeted manner. The most important characteristics include for example thermal capacity thermal conductivity
electrical conductivity
density
hardness
ductility
porosity
thermal shock resistance
thermal cycling stability
thermal coefficient of expansion
chemical stability, inter alia Therefore the present invention relates to a modified red mud as defined in one of claims 1 and 4, a method for production of a modified red mud having the features of claim 12, a storage medium comprising a modified red mud, a heat storage means comprising a storage medium, and numerous uses of a modified red mud as a storage medium, in particular in a heat storage means, as well as the methods for optimal application.

In one embodiment a modified red mud contains the following components:
haematite ($Fe_2O_3$),
corundum ($Al_2O_3$),
rutile ($TiO_2$) and/or anatase ($TiO_2$),
quartz ($SiO_2$),
optionally perovskite ($CaTiO_3$) and
optionally pseudobrookite ($(Fe^{3+},Fe^{2+})_2(Ti,Fe^{3+})O_5$) nepheline (($Na,K)[AlSiO_4]$) and/or hauynite (($Na,Ca)_{4-8}[Al_6Si_6O_{24}(SO_4)]$).

In this case the modified red mud is substantially free from $Na_2O$ and/or glass, such as for example soda glass and/or potash-soda glass. The modified red mud is preferably likewise substantially free of $K_2O$ and/or $CaO$ and/or other alkali and alkaline earth oxides.

Red mud is the insoluble proportion which remains after the alkaline leaching of aluminium from bauxite. Red mud is rinsed in the alkaline medium at disposal sites. Thus red mud contains an undefined amount of alkali in the form of free caustic soda solution or in the form of sodium carbonate, which is produced by carbonisation with CO2. Since this free alkali content intervenes actively, but arbitrarily, in the formation of the mineralogical phases, in order to create defined and controllable conditions this alkali content, i.e. Na2O but also K2O and the alkaline earth content, i.e. CaO and MgO, must be removed at least predominantly, preferably completely, by washing or neutralisation. Thus the modified red mud is substantially free of Na2O and K2O; therefore soda glass and/or potash glass cannot form during tempering.

In the context of the present application "substantially free" can be understood in particular as a content of less than 0.5% by weight, in particular less than 0.2% by weight, in particular less than 0.1% by weight, in particular less than 0.05% by weight, in particular less than 0.03% by weight, in particular less than 0.01% by weight.

Thus the modified red mud can contain, in particular, the components (crystalline) haematite ($Fe_2O_3$), corundum ($Al_2O_3$), rutile ($TiO_2$) and/or anatase ($TiO_2$) and quartz ($SiO_2$) or can substantially consist of these components. Further components can be included, but do not have to be included. In particular, perovskite ($CaTiO_3$), pseudobrookite (($Fe^{3+},Fe^{2+})_2(Ti,Fe^{3+})O_5$), nepheline (($Na,K)[AlSiO_4]$) and/or hauynite (($Na,Ca)_4, 8[Al_6Si_6O_{24}(SO_4)]$) may be mentioned as further (optional) components. In this case, however, the modified red mud contains substantially no $Na_2O$ (likewise $K_2O$ and CaO) and/or glass.

In one embodiment the modified red mud can contain
  48 to 55% by weight, in particular 49 to 54% by weight, in particular 50 to 53% by weight, of haematite ($Fe_2O_3$),
  13 to 18% by weight, in particular 14 to 17% by weight, in particular 15 to 16% by weight, of corundum ($Al_2O_3$),
  8 to 12% by weight, in particular 9 to 11% by weight, of rutile ($TiO_2$) and/or anatase ($TiO_2$) and
  2 to 5% by weight, in particular 3 to 4% by weight, of quartz ($SiO_2$), and
  less than 0.03% by weight, in particular less than 0.01% by weight, of $Na_2O$ and/or less than 0.1% by weight, in particular less than 0.05% by weight, of glass.

In one embodiment a modified red mud can be obtained by heating of red mud substantially washed free of $Na_2O$ (or neutralised) and having a mineral composition of
  10 to 55%, in particular 10 to 50% by weight of iron compounds,
  12 to 35% by weight of aluminium compounds,
  3 to 17% by weight, in particular 5 to 17% by weight of silicon compounds,
  2 to 12% by weight, in particular 2 to 10% by weight of titanium dioxide,
  0.5 to 6% by weight of calcium compounds, and
  optionally further unavoidable impurities,
to a temperature of at least 800° C., in particular at least 850° C., in particular at least 900° C., in particular at least 950° C., preferably at least 1000° C., for example in a range between 1100 and 1200° C., for instance 1150° C. A modified red mud which can be obtained in this way can also be designated as a tempered or sintered red mud or as a haematite ceramic.

Red mud, which remains as an insoluble proportion after the alkaline leaching of aluminium from bauxite, usually contains significant amounts of $Na_2O$ or other alkali and alkaline earth oxides, which can also be present as hydroxides or as carbonates. During heating of such an (unwashed) red mud to temperatures above 800° C., in particular above 1000° C., these alkaline constituents cause (crystalline) $SiO_2$ likewise contained in red mud to be converted into glass, such as for example soda glass and/or potash-soda glass, which is a poor conductor of heat, if not even a heat insulator, and thus is massively detrimental to or even diametrically opposed to the intended use of the red mud modified according to the invention for storing heat from current (power-heat coupling) or for conversion of heat into current (heat-power coupling). Further substances which are undesirable according to the invention can form during heating of unwashed red mud due to the high reactivity of the alkali and alkaline earth oxides and the like. Furthermore, the presence of such reactive substances in the red mud modified according to the invention is also detrimental for the intended use in a heat storage means, which brings with it a continuous heating and cooling of the modified red mud in the heat storage means, since a chemical stability of the modified red mud (that is to say no chemical reactions during the repeated heating and cooling in the selected working temperature range from room temperature to approximately 1000° C.), and a physical stability (different thermal dimensions, or shrinkage of the mineral phases present with an effect on the thermal shock resistance and thermal cycling stability) for the service life of the heat storage means according to the invention, is crucial.

It is therefore necessary according to the invention to wash the red mud before heating, so that it is substantially free of $Na_2O$ (and other alkali and alkaline earth oxides, such as $K_2O$ and/or CaO) and is preferably also free of organic constituents which can have a reducing effect during heating. Since $Na_2O$, and also the other alkali and alkaline earth oxides, are alkaline (that is to say basic) substances, the substantially $Na_2O$-free washing can also be designated as a neutralisation or a correspondingly washed red mud can be designated as neutralised red mud. The washing advantageously takes place by means of water, to which an acid or an acidic substance, such as iron(II)chloride, can be added in an advantageous manner.

In one embodiment (after tempering) the modified red mud can be substantially free of one, two, three or all four of the following components:
  gibbsite ($Al(OH)_3$),
  goethite ($FeO(OH)$),
  boehmite ($AlO(OH)$),
  cancrinite ($Na_6Ca_2[(CO_3)_2|Al_6Si_6O_{24}]$).

In one embodiment the modified red mud can be substantially free of one, two, three, four or all five of the following components:
  aluminium titanate ($Al_2TiO_5$),
  (elemental) iron (Fe),
  mayenite ($Ca_{12}Al_{14}O_{33}$),
  ulvospinell ($Fe_2TiO_4$),
  andradite ($Ca_3Fe_2(SO_4)_3$).

These undesirable components can be produced when the red mud has not been sufficiently and carefully washed, inter alia has also been freed of organic constituents, and/or has been heated or sintered in a reducing atmosphere.

The heating can take place at the stated temperature in particular over a time period of 5 minutes to 36 hours, in particular 5 minutes to 24 hours, in particular 5 minutes to 12 hours, in particular 5 minutes to 6 hours, in particular 5 minutes to 2 hours, in particular 5 minutes to 1 hour, in particular 5 minutes to 30 minutes.

In one embodiment the modified red mud can have a porosity of less than 15%, in particular in the range from 5 to 12%. In this case the pore sizes are small. Due to the modification of the red mud according to the invention, such a comparatively low porosity is readily achievable and is particularly suitable in order to achieve an advantageous high thermal capacity for the intended use of the red mud modified according to the invention and typical thermal conductivity for inorganic substances (because of the low phonon scattering on boundary surfaces due to the comparatively low porosity). The porosity can be determined in particular by means of gas adsorption isotherms according to the BJH method.

In one embodiment the modified red mud can have a density in the range from 3.90 to 4.0 g/cm$^3$, in particular from 3.91 to 3.95 g/cm$^3$, in particular from 3.92 to 3.94 g/cm$^3$, in particular approximately 3.93 g/cm$^3$. Due to the modification of the red mud according to the invention, such a comparatively high density is likewise readily achievable and is particularly suitable in order to achieve an advantageous high thermal capacity for the intended use of the red mud modified according to the invention and typical thermal conductivity.

In one embodiment the modified red mud can have a mean particle size d50 in the range from 3 to 10 μm, in particular from 5 to 8 μm. The mean particle size d50 can be determined in particular by means of laser diffraction or (MALVERN) laser diffraction according to ISO 13320 (2009).

In one embodiment the modified red mud can have a particle size d10 in the range from 0.5 to 2.5 μm, in particular from 1.0 to 2.0 μm, and/or a particle size d90 in the range from 15 to 50 μm, in particular from 20 to 40 μm. The mean particle size d10 can be determined in particular by means of laser diffraction and the particle size d90 can be determined by means of laser diffraction (MALVERN) according to ISO 13320 (2009).

In one embodiment the modified red mud can have a specific thermal capacity at 20° C. in the range from 0.6 to 0.8 kJ/(kg*K), in particular from 0.65 to 0.75 kJ/(kg*K), and/or a specific thermal capacity at 726.8° C. in the range from 0.9 to 1.3 kJ/(kg*K), in particular from 0.95 to 1.2 kJ/(kg*K). The specific thermal capacity can be determined in particular according to DIN EN ISO 11357-4.

In one embodiment the modified red mud can have a specific thermal conductivity in the range from 3 to 35 W/(m*K), in particular from 5 to 20 W/(m*K) in particular from 8 to 12 W/(m*K). The specific thermal conductivity can be determined in particular by means of plate-shaped test objects in a lambda meter according to DIN ISO 8302.

In one embodiment the modified red mud can be present in the form of a compressed solid material.

The method for producing a modified red mud comprises washing and drying of red mud with a mineral composition of 10 to 55%, in particular 10 to 50% by weight of iron compounds,
12 to 35% by weight of aluminium compounds,
3 to 17% by weight, in particular 5 to 17% by weight of silicon compounds,
2 to 12% by weight, in particular 2 to 10% by weight of titanium dioxide,
0.5 to 6% by weight of calcium compounds, and
optionally further unavoidable impurities, and subsequently heating of the washed (neutralised) red mud to a temperature of at least 800° C., in particular at least 850° C., in particular at least 900° C., in particular at least 950° C., preferably at least 1000° C., for example in a range between 1100 and 1200° C., for instance 1150° C.

The washing of the red mud serves in particular so that for the reasons set out above the red mud to be heated is substantially free of Na$_2$O (and other alkali and alkaline earth oxides, such as K$_2$O and/or CaO) and is preferably also free of organic constituents which can have a reducing effect during heating. For this purpose the washing can take place in particular by means of water, to which an acid or an acidic substance, such as iron(II)chloride, can be added in an advantageous manner.

In one embodiment the heating can take place at the stated temperature in particular over a time period of 5 minutes to 36 hours, in particular 5 minutes to 24 hours, in particular 5 minutes to 12 hours, in particular 5 minutes to 6 hours, in particular 5 minutes to 2 hours, in particular 5 minutes to 1 hour, in particular 5 minutes to 30 minutes.

In one embodiment the heating of the washed and dried red mud can be carried out in a non-reducing (neutral) (gas) atmosphere. As a result an (undesirable) reduction of components in the red mud, in particular of iron compounds, can be avoided.

In one embodiment the red mud is heated only once (i.e. not more times). Heating of the red mud several times, such as for example pre-sintering, is not necessary as a rule in the method according to the invention, so that this additional method step (which is unnecessary according to the invention) can advantageously be omitted.

In one embodiment the method can also comprise a preceding granulation of the (sintered or tempered) red mud after the heating and subsequently a compression of the granulated red mud or of the granulate. A granulation of the tempered red mud simplifies (or even facilitates) a compression within a moisture range which is set to be very narrow.

In one embodiment, in the method for production of a modified red mud a modified red mud according to the invention can be produced.

The storage medium comprises a modified red mud according to the invention. In the context of the present application a "storage medium" can be understood in particular as the active (or actual) storing material. For example, in the case of a heat storage means the storage medium can be a heat-storing material which must have a corresponding (or suitable) thermal capacity and thermal conductivity.

The storage medium can optionally contain further components, in addition to the modified red mud.

In one embodiment the storage medium can further comprise one or more of the following components:

an agent for preventing the inclusion of air (air absorption in the interior of the storage medium) and/or air adsorption (accumulation of air on the surface). (For example, the matrix for the current/heat storage device can be treated by means of a double screw extruder with the addition of 5 to 10% by weight of polydimethysiloxane or polydiphenylsiloxane polymer and with simultaneous use of a vacuum degassing with a maximum output (for example series-connected rotary vane vacuum pumps) so that all air inclusions are eliminated by the intensive dispersion in the polysiloxane system. The material obtained is kneadable).

an agent for improvement of the thermal conductivity, in particular selected from the group consisting of metal colloids, metal powders, graphite and substances containing silicon, an agent for formation of a thixotropic composition (in particular by the addition of polypentaerythritol and a carboxylic acid (C18 for example) to the heat carrier matrix before the treatment in the double screw extruder, the matrix can be adjusted thixotropically for example in an extended range. In the activation process of the current/heat storage means, i.e. slow heating, in addition to the polysiloxane these agents can also be thermally decomposed to carbon, wherein the resulting carbon has no negative effects on the desired characteristics of the current/heat storage device means, but improves the thermal conductivity.

In one embodiment the storage medium can be substantially free of softening agents ("plasticisers"). Softeners are not usually necessary in the red mud according to the invention, so that these softeners (which are unnecessary according to the invention) can advantageously be omitted.

The heat storage means comprises a storage medium according to the invention. In the context of the present application a "heat storage means" can be understood in particular as a device which contains the storage medium as an active heat-storing material and in addition it optionally also has further apparatus elements.

In one embodiment the heat storage means can be a current/heat store. In the context of the present application a "current/heat store" can be understood in particular as a storage device which can convert electrical energy into thermal energy (heat energy) and/or can convert the thermal energy into electrical energy, and which in particular can both convert electrical energy into thermal energy and also thermal energy into electrical energy.

In one embodiment the heat storage means can also comprise devices for charging and discharging the heat storage means. Devices for charging and discharging the heat storage means can for example contain mechanical components, and/or other components, such as for example conductive contacts or connections, in particular electrically conductive contacts or connections and/or heat-conducting contacts or connections.

In one embodiment the heat storage means can be a current/heat store which also comprises means for converting current into heat such as heating elements or resistance wires or heating wires. As a result a conversion of electrical energy into thermal energy is possible. In this case these means can be in indirect or direct contact with the storage medium, for example embedded therein.

In an implementation phase the heat storage means can be a heat/current store which comprises means for conversion of heat into current such as equipment for generating steam or hot air, turbines and generators. As a result a conversion of heat into current is possible.

The heat storage means according to the invention can be configured for cogeneration both by power/heat coupling and also by power/heat/power coupling. In other words the heat storage means according to the invention can be used for cogeneration by a power/heat coupling (or current (power)/heat coupling) and also by a power/heat/power coupling (or current (power)/heat/current (power) coupling). All the properties and characteristics necessary therefor, such as density p, specific thermal conductivity Cp, working temperature range ΔT, thermal conductivity within the substance A, intrinsic transmission capability of the thermal energy in the storage device (thermal diffusivity), porosity, grain or particle size distribution, hardness and simultaneously high ductility, as well as chemical stability, can be provided by the modified red mud according to the invention because of its chemical composition or its modification due to manufacturing tolerances.

Thus the mode of action of the heat storage means can be broken down into two steps:
 1st step: cogeneration by power/heat coupling
 2nd step: cogeneration by heat/power coupling.

Both steps can be used in each case independently or in combination as cogeneration by power/heat/power coupling.

The cogeneration by power/heat coupling operates with an effectiveness of 95-100%. Thus the heat storage means according to the invention is an ideal medium for transmitting heat to systems which require heat, in other words it is a heat transmitter of an ideal type. This includes for example buildings (floor and wall heating systems), also technical equipment of all kinds such as boilers, rotary kilns, distillation equipment, pipelines, coffee machines and many more.

The heat transfer (power/heat coupling) to all systems of this type is most attractive, since a method with an effectiveness of 95-100% is used. The currently used systems for heat transfer usually operate with an effectiveness of 25-35%. Thus the cogeneration by power/heat coupling reduces the energy demand and thus the energy costs to approximately ⅓. Thus enormous amounts of $CO_2$ from the combustion of fossil fuels can be saved on a global scale. The heat storage means for cogeneration by power-heat coupling can be designed so that apart from the heat transfer side all other surfaces are thermally insulated. This applies to spaces as well as metal surfaces of technical equipment of all types.

The invention further relates to the use of a modified red mud according to the invention as a storage medium, in particular in a heat storage means.

In one embodiment the modified red mud can be used for storage of heat at a temperature up to 1000° C., in particular at a temperature of more than 100° C. up to 1000° C. However, use for storage of heat at a temperature of more than 80° C., in particular more than 90° C. is possible.

In one embodiment the modified red mud can be used a storage medium which can be simultaneously heated and cooled. In this way a type of control is provided, by means of which for example the storage medium is not heated above 500° C. during operation, so that an inversion of (trigonal) α-quartz to (hexagonal) β-quartz can be avoided. That is to say, a heating of the storage medium above a predetermined threshold value, such as for example 500° C., is counteracted by simultaneously emitting a corresponding amount of heat to a different medium and corresponding cooling.

This condition constitutes a revolutionary further development of the previous storage technologies. In the past all storage devices could be either charged or discharged (successively), such as for example batteries or pumped storage facilities or power/heat stores, in which first of all hot air is generated by means of current and then heats stones (charging operation). In the 2nd step (discharging operation) the hot stones heat cold air to hot air, which then makes steam from water for driving turbines and generators. Both in the charging operation in the discharging operation, temperature ranges from approximately 100° C. to for example 1000° C. or parts thereof are run through.

A significant problem in the described 2-step method is the cubic expansion capacity or shrinkage capacity of the crystalline substances contained in the storage substance in the temperature ranges which are run through during charging and discharging. Since all contained substances have different coefficients of expansion in the respective temperature range, the substance (for example natural stones) is systematically broken up and thus destroyed, i.e. the thermal shock resistance and the thermal cycling stability are not provided to the necessary extent.

If charging and discharging can take place simultaneously it is no longer necessary to run through relatively large temperature ranges. The operation of the storage device can now take place at an arbitrary and desired temperature, or within a narrow temperature range. The energy delivered during the charging operation is drawn off to the same extent during the discharging operation. In other words: with an approximately constant temperature the coefficient of expansion remains stable and does not change. Thus the destructive force of the coefficients of expansion which change specifically in each contained substance does not occur. The thermal shock resistance and the thermal cycling stability are provided, i.e. the heat storage means can be operated in the long term. For example, if 500° C. is not exceeded, no decompositions take place apart from those of hydroxides, oxide hydrates and carbonates, and also no sintering processes etc. occur. The storage substance remains stable in all parameters, and changes such as decompositions, phase transformations, sintering, are omitted. The exclusion of free caustic soda solution or of sodium carbonate resulting therefrom by carbonisation prevents the alkali or alkaline earth oxides from having an influence on the formation of chemical-mineralogical species in the temperature ranges which are run through. Only within this way can clearly defined substances be formed with defined parameters in every respect. For example, only the following substances are contained in the storage substance according to the invention: haematite, alpha-$Al_2O_3$, anatase, rutile, perovskite, cancrinite and quartz.

If peak current amounts occur which are to be stored, the working temperature range of the storage device must be extended for example to 1000° C., the chemical-mineralogical constituents of the storage material change (cf. Table 1 "mineral phase bauxite residue"), the thermal cycling stability and the thermal shock resistance are nevertheless maintained, since the charging and discharging operations take place at a temperature or in a narrow temperature range, i.e. the self-destruction of the storage device induced by the coefficient of expansion cannot occur.

In one embodiment the modified red mud can be used as a storage medium in a current/heat store.

In one embodiment the storage medium can be heated by means of electrical current and/or cooled while electrical current is generated.

In one embodiment the modified red mud can be used for storage of electrical power obtained from renewable energy sources. In the context of the present application "renewable energy sources" can be understood in particular to be wind power, hydropower, tidal power, solar power, geothermal energy and biomass, but preferably renewable energy sources for which the timescale is largely removed from human influence and for which therefore a possibility of effective storage is very important, such as in particular wind power, tidal power and solar power.

In one embodiment the current/heat store can comprise resistance wires, which are heated by electrical current and thus heat the storage medium.

In one embodiment thermal power stored in the storage medium can be transferred to another medium, preferably a fluid medium, and so the storage medium can be cooled (discharged), wherein the other medium or also heat exchange medium is selected in particular from the group consisting of water, (steam), molten salt, such as for example ionic liquids, and thermal oil or gas.

The storage medium can have the other medium or heat exchange medium flowing through it for example in the manner of a heat exchanger. A corresponding configuration of the storage medium as a heat exchanger is possible due to the at least initial free formability of the storage medium. In this case for example meandering pipes for corresponding fluid media can be provided in a corresponding storage medium element/storage medium elements. On the other hand, however, elements of the storage medium shaped as geometric blocks can also be arranged so that a corresponding pipe system with a rectangular, polygonal or round cross-section is produced. Alternatively, the other medium or heat exchange medium could also flow over or sweep over corresponding blocks of the storage medium when this other medium or heat exchange medium flows away over the surface(s) of the storage medium at a preselectable flow speed.

In this case the control of the cooling (discharging) of the storage medium can take place for example by means of the temperature and flow speed of the other medium or heat exchange medium. As a result a heating and/or cooling of the storage medium above or below a predetermined threshold value can be avoided.

In this case the generation of electrical current can take place for example by means of steam turbines or by means of gas turbines, wherein in the latter case the storage medium could for example take over the function of the "combustion chamber" for heating the working gas. In this case air can be used as working gas.

In one embodiment the storage medium and a discharge device can be provided integrally or as separate elements. Here for example installations are conceivable in which storage medium elements, regulating device and current generation unit form a system which is for example integrated and installed in the region of a building with a solar installation as a closed unit.

In one embodiment the current/heat store can be used for transport of electrical power after cogeneration has taken place without the presence of line systems. In this connection for example storage medium elements with a low mass, for example three to five kilograms, could be provided, which can then be transported in thermal insulation boxes securely and with low heat loss over wide sections. Once arrived at the destination, electrical energy can then be recovered again from the thermal energy.

In one embodiment the current/heat store can generate electrical current again after cogeneration by heat/current coupling. In this connection gas or steam turbines but also thermoelectric generators, based upon the thermoelectric or Seebeck effect, can be used.

In one embodiment the current/heat store can be used for supplying power to insulated energy consumers.

In one embodiment insulated energy consumers can be supplied with thermal energy and electrical energy. That is to say that here a so-called isolated operation, independently of an electrical grid connection, is possible.

In one embodiment the current/heat store can be used for supplying power to machines or mobile devices such as vehicles. This is suitable for example for vehicles having a gas turbine drive, in which the working medium can be heated by means of a storage medium element.

A heat storage means which can be simultaneously charged and discharged is always, in the sense of cogeneration by power/heat/power coupling, a thermal power plant consisting of current generator such as for example renewable energy sources (and thus $CO_2$-free), storage device, turbine and generator.

However, a heat storage means of this type can also be used in an ideal form as a heat exchanger to other systems. In this case this is cogeneration by power/heat coupling for example in the field of apparatus technology. It is no longer necessary for the heating for example of boilers, rotary kilns or technical facilities of all types to take place for example with steam or hot combustion gases, but instead it is possible to heat the storage substance for example by power (current from EE) and to transmit by direct contact on for example metal or ceramics or other substances. Since the effectiveness of the cogeneration by power/heat coupling is 95-100%, the heating of systems having similar efficiency rates is possible. These advantages will significantly lower the energy costs in future and will simplify the technical constructions. This includes for example the heating of buildings by elements which can be heated and contain the storage medium.

Further objects and advantages of embodiments of the present invention are disclosed with reference to the following detailed description and the attached drawings.

Figure 1:
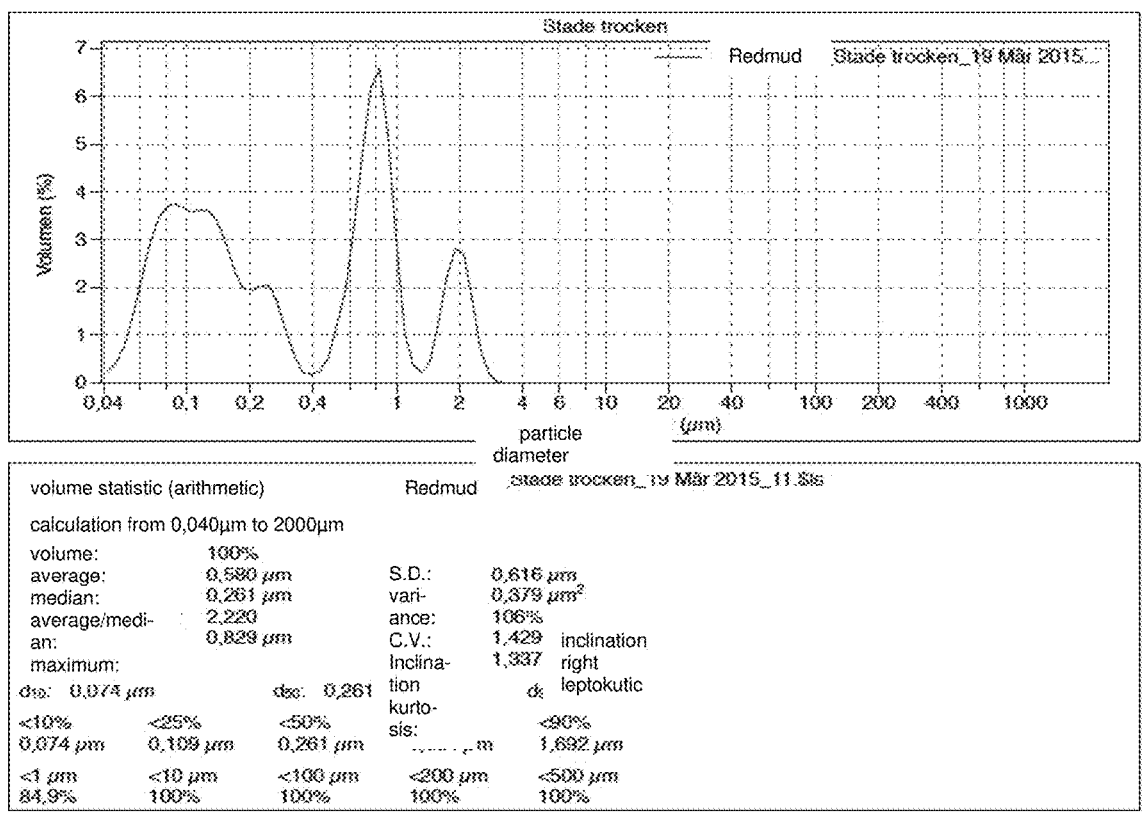
FIG. 1 shows a particle size distribution of a dry conventional bauxite residue.

Further details of the present invention and further embodiments thereof are described below. However, the present invention is not limited to the following detailed description, but it serves merely for illustration of the teaching according to the invention.

It may be pointed out that features which are described in connection with an exemplary embodiment or an exemplary subject can be combined with any other exemplary embodiment or with any other exemplary subject. In particular, features which are described in connection with an exemplary embodiment of a modified red mud according to the invention can be combined with any other exemplary embodiment of a modified red mud according to the invention as well as with any exemplary embodiment of a method for production of a modified red mud, of a storage medium, of a heat storage means and of uses of a modified red mud, and vice versa, unless explicitly stated otherwise.

If a term is designated with an indefinite or definite article, such as for example "a", "an" and "the", in the singular, this also includes the term in the plural, and vice versa, so long as the context does not specify otherwise unambiguously. The expression "comprise" or "have", such as is used here, includes not only the meaning of "contain" or "include", but can also mean "consist of" and "substantially consist of".

For the studies conducted within the context of the present invention, first of all the material to be studied was characterised at room temperature, and in particular the chemical as well as the mineralogical composition were determined. Furthermore, this material was heated slowly to 1000° C. heated, and in this case every 100° C. the mineralogical phases as well as the density and the specific thermal capacity were determined.

The characterisation of the material to be studied:

1. CHEMICAL COMPOSITION (TYPICAL FOR BAUXITE RESIDUE)

10 to 50% by weight of iron compounds
12 to 35% by weight of aluminium compounds
5 to 17% by weight of silicon compounds
2 to 10% by weight of titanium dioxide
0.5 to 6% by weight of calcium compounds

2. MINERALOGICAL COMPOSITION

In the initial state of the study the following mineral phases were determined radiographically:
haematite
goethite
anatase
rutile
perovskite
boehmite
gibbsite
cancrinite
quartz

3. PARTICLE SIZES

The particle diameters (μm) are shown in FIG. 1. According to this the substance is very fine and has 3 maxima. With a good distribution it was to be expected that the substance has a high density, since the very fine crystals can be inserted into cavities in the medium-fine crystals and these latter can be inserted into cavities in the coarser crystals. The measured density of 3.63 (g/cm$^3$) confirms this assessment.

By addition of thermally stable and chemically inert substances with arbitrary particle size distribution, any cavities still present can be reduced with an effect on mechanical, electrical and thermal characteristics. This constitutes a further optimisation of the storage mechanism in the context of the invention.

4. CONDUCT OF THE TEST

Samples of the test substance were heated in stages under oxygen and under nitrogen up to 1,000° C. Samples were taken in each case at 100° C., 200° C., 300° C., 400° C., 500° C., 600° C., 700° C., 800° C., 900° C. and 1000° C. and the changes to the mineralogical composition as well as the density were determined.

The specific thermal capacity was measured in the temperature range from room temperature (30.26° C.) to 584.20° C.

5. INTERPRETATION OF THE RESULTS 5.1 Mineral Phases

The mineralogical composition of the substance changes in accordance with the temperature (see following Table 1).

At approximately 300° C. gibbsite decomposes, at approximately 400° C. goethite decomposes and at approximately 500° C. boehmite breaks down. At 573° C. alpha-quartz is transformed into beta-quartz.

Above 600° C. the $CO_2$ emission of cancrinite $Na_6Ca_2$ $[(AlSiO_4)_6]$ takes place substantially from haematite ($Fe_2O_3$) and corundum ($Al_2O_3$) and, in smaller proportions, of $TiO_2$, cancrinite and perovskite.

At 1000° C. cancrinite and the two $TiO_2$ phases anatase and rutile are converted into the minerals pseudobrookite $[(Fe^{3+})_2Ti]O_5$ and nepheline $[(Na,K)[AlSiO_4]$.

TABLE 1

Mineral phases bauxite residue (bulk density 0.944 g/cm³)

| T [° C.] | Mineral phases Bauxite residue GEA | Density $\frac{g}{cm3}$ |
|---|---|---|
| 100 | Haematite, goethite, anatase, rutile, perovskite, boehmite, gibbsite, cancrinite, quartz | 3.63 |
| 200 | Haematite, goethite, anatase, rutile, perovskite, boehmite, gibbsite, cancrinite, quartz | 3.64 |
| 300 | Haematite, goethite, anatase, rutile, perovskite, boehmite, cancrinite, quartz, α-$Al_2O_3$ | 3.74 |
| 400 | Haematite, goethite, anatase, rutile, perovskite, boehmite, cancrinite, quartz, α-$Al_2O_3$ | 3.81 |
| 500 | Haematite, anatase, rutile, perovskite, boehmite, cancrinite, quartz, α-$Al_2O_3$ | 3.81 |
| 600 | haematite, anatase, rutile, perovskite, cancrinite, quartz, α-$Al_2O_3$ | 3.89 |
| 700 | haematite, anatase, rutile, perovskite, cancrinite, quartz, α-$Al_2O_3$ | 3.60 |
| 800 | haematite, anatase, rutile, perovskite, cancrinite, quartz, α-$Al_2O_3$ | 3.71 |
| 900 | haematite, anatase, rutile, perovskite, cancrinite, quartz, α-$Al_2O_3$ | 3.73 |
| 1000 | haematite, anatase, rutile, perovskite, quartz, α-$Al_2O_3$, nepheline, pseudobrookite | 3.93 |

5.2 Density

Figure 2:
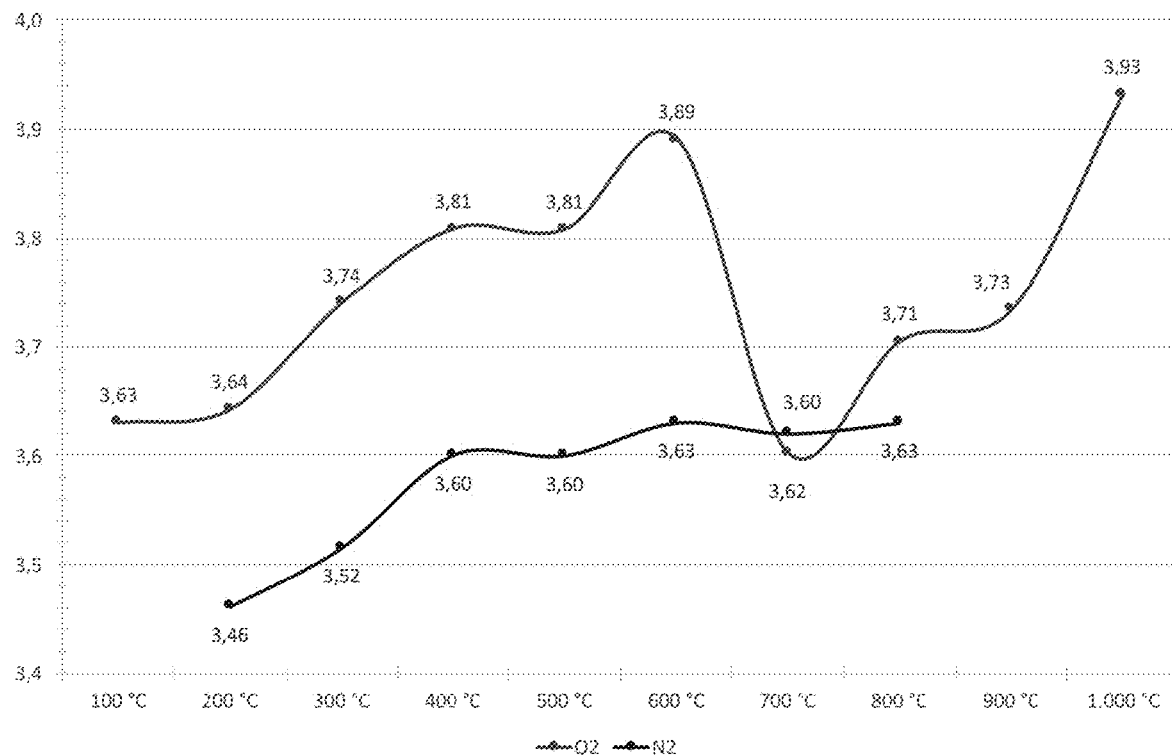
FIG. 2 shows the density characteristics of a test sample during the heating of red mud from 100° C. up to 1000° C. in an oxygen ($O_2$) or a nitrogen ($N_2$) atmosphere.

As can be seen from FIG. 2, the density develops as a function of the temperature from 3.63 (g/cm³) at 100° C. to 3.93 (g/m³) at 1000° C. The decomposition of mineral phases with elimination of water and $CO_2$ as well as sintering processes reduce the density between 600° C. and 700° C., in order then up to 1,000° C. to rise again to a value of 3.93 (g/cm³).

For applications in the thermal range it is only possible to use substances which are stable as bodies and which in the respective arbitrary temperature ranges do not eliminate any further gases such as $H_2O$ or $CO_2$ and also do not undergo any further sintering processes. Oxides such as $Fe_2O_3$, $Al_2O_3$, $TiO_2$ or $SiO_2$ hardly change significantly in the event of temperature increases. A significant characteristic is revealed by the fact that the density of the substance heated to 1,000° C. remained constant during cooling constant remained, for example no rehydrations occurred.

5.3 Particle Size

Figure 3:
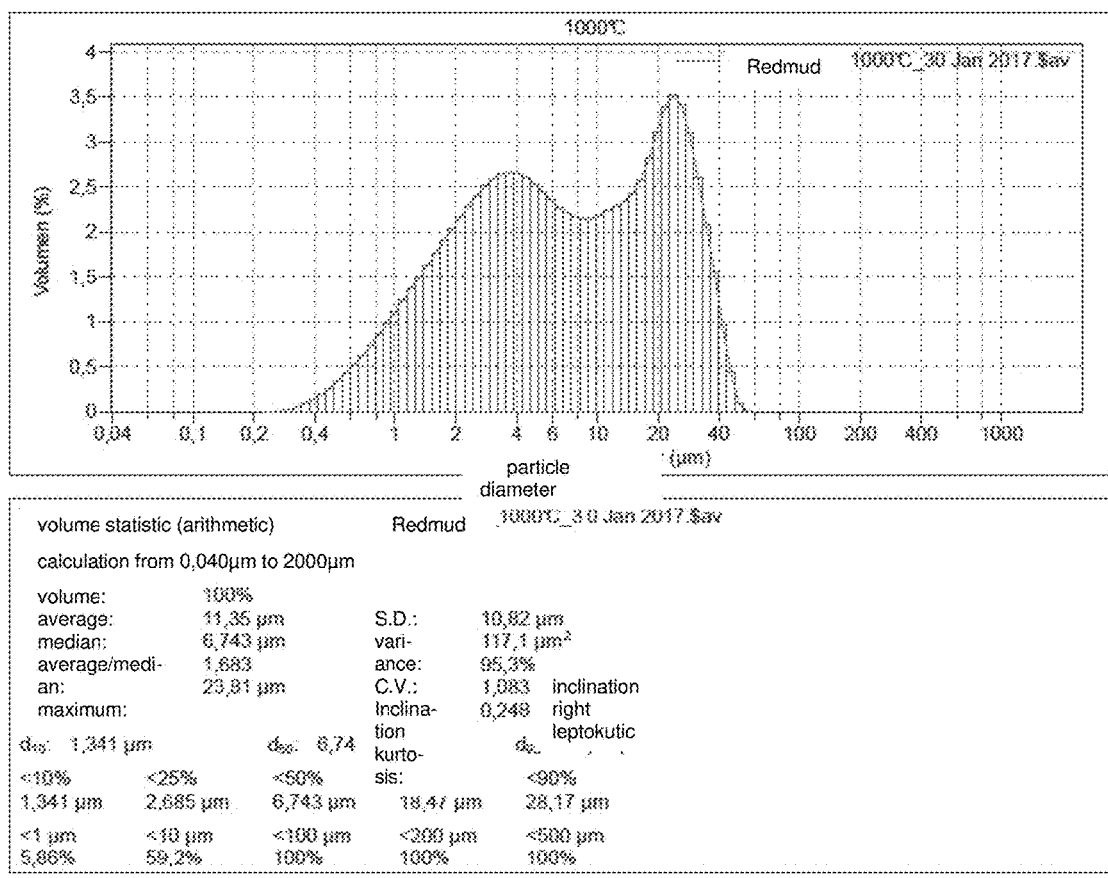
FIG. 3 shows a particle size distribution of a red mud tempered at 1000° C. according to an exemplary embodiment of the invention.

The tempering of the substance according to the invention up to temperatures of 1,000° C. shifts the particle diameters to significantly higher values for example by decomposition of hydroxides, oxide hydrates or carbonates and by sintering processes (cf. FIG. 3). Thus for example the $d_{10}$ values grow from 0.074 μm to 1.341 μm the $d_{30}$ values grow from 0.261 μm to 6.743 μm the $d_{90}$ values grow from 1.692 μm to 28.17 μm

5.4 Specific Thermal Capacity

The specific thermal capacity of substances is a function of the temperature. As the temperature increases, the specific thermal capacity also increases. The following Table 2 shows corresponding examples.

TABLE 2

Specific thermal capacity at different temperatures:

| | | 20° C. | 726.8° C. |
|---|---|---|---|
| $Fe_2O_3$ | (kJ/(kg * K)) | 0.650 | 0.944 |
| $Al_2O_3$ | (kJ/(kg * K)) | 0.775 | 1.223 |
| $SiO_2$ | (kJ/(kg * K)) | 0.732 | 1.148 |
| $TiO_2$ rutile | (kJ/(kg * K)) | 0.689 | 0.937 |
| $TiO_2$ anatase | (kJ/(kg * K)) | 0.691 | 0.943 |

In mixtures the specific thermal capacity is the sum of the specific thermal capacities of the respective components of the mixtures.

The characterisation of the substance provided shows a mixture of different mineral substances. During tempering, parts of the substances decompose, and for example eliminate water or $CO_2$ with formation of oxides or other chemically stable mineral phases. Furthermore, sintering processes take place.

Figure 4:
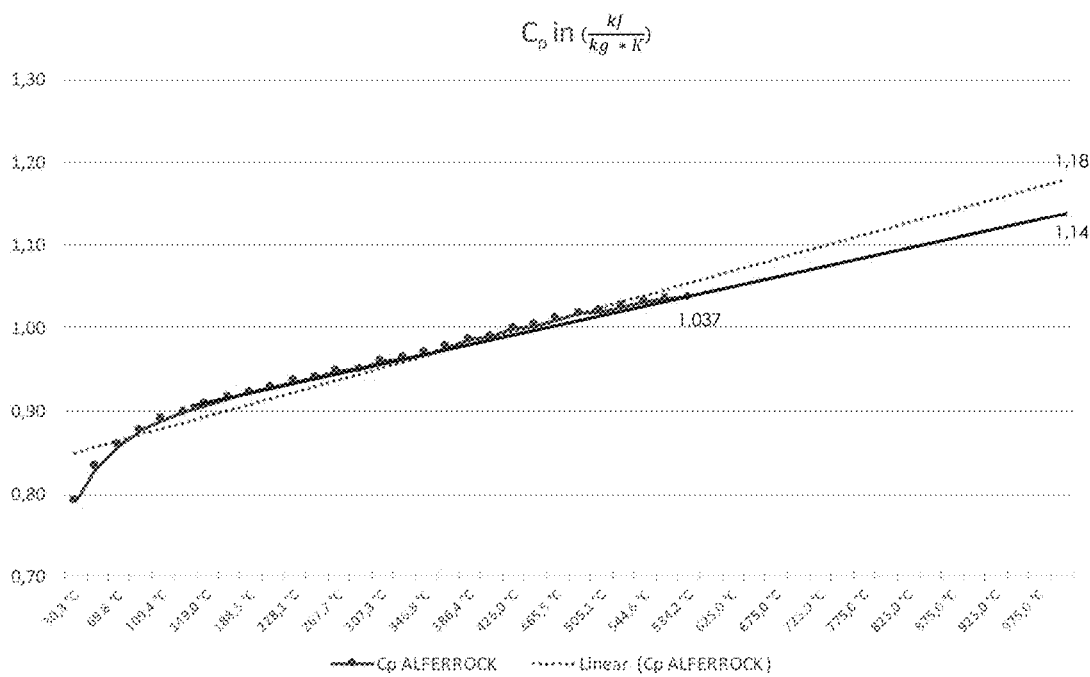
FIG. 4 is a graphical representation of the series of measurements shown in Table 3 for the specific thermal capacity of ALFERROCK® according to an exemplary embodiment of the invention.

The measurement results of these substances show a value of 0.791 (kJ/(kg*K)) at 30° C. and a value of $$1.037\left(\frac{kJ}{kg*K}\right)$$

at 584° C. At 1,000° C. a value of $$1.14-1.18\left(\frac{kJ}{kg*K}\right)$$

can be assumed by extrapolation (cf. FIG. 4).

TABLE 3

Series of measurements of specific thermal capacity ALFERROCK ®

| Temperature of the sample [° C.] | thermal capacity $c_p$ ALFERROCK ® [(kJ)/(kg * K)] |
|---|---|
| 30.3° C. | 0.791 |
| 50.1° C. | 0.832 |
| 69.8° C. | 0.858 |
| 89.6° C. | 0.877 |
| 109.4° C. | 0.89 |
| 129.2° C. | 0.898 |
| 149.0° C. | 0.907 |
| 168.8° C. | 0.915 |
| 188.5° C. | 0.922 |
| 208.3° C. | 0.928 |
| 228.1° C. | 0.935 |
| 247.9° C. | 0.94 |
| 267.7° C. | 0.948 |
| 287.5° C. | 0.95 |
| 307.3° C. | 0.96 |
| 327.0° C. | 0.963 |
| 346.8° C. | 0.969 |
| 366.6° C. | 0.977 |
| 386.4° C. | 0.985 |
| 406.2° C. | 0.989 |
| 426.0° C. | 0.999 |
| 445.7° C. | 1.002 |
| 465.5° C. | 1.01 |
| 485.3° C. | 1.017 |
| 505.1° C. | 1.02 |
| 524.9° C. | 1.026 |
| 544.6° C. | 1.031 |
| 564.2° C. | 1.035 |
| 584.2° C. | 1.037 |

During cooling of the substance heated to 1,000° C. the $c_p$ values revert to values which correspond to the respective temperatures. However, since the starting substance has changed due to decompositions of mineral phases and the formation of other substances and also sintering processes have taken place, after the cooling the substance will have different values of the specific thermal capacity from the starting substance. It is important to establish that after the tempering a stable substance is available, which can be heated and cooled with any frequency and which in this case does not undergo any further change to the individual substances in the mixture. As already mentioned, this also applies for the density.

5.5 Specific Thermal Conductivity

The thermal conductivity of a system is inter alia a function of parameters such as pressure, temperature, mineralogical composition, porosity, density, etc.

As described, all thermally unstable components have been decomposed by heating of the substance provided. After the tempering a substance occurs which consists of corundum ($Al_2O_3$), haematite ($Fe_2O_3$), rutile and anatase ($TiO_2$) as well as fireproof substances such as pseudobrookite [$(Fe^{3+})_2Ti]O_5$ or nepheline [$(Na,K)[AlSiO_4]$].

The following Table 4 shows the values of the thermal conductivity and density of those substances which constitute the most important components of the tempered substance.

TABLE 4

Thermal conductivity and density of the individual components

| | Thermal conductivity: | Density |
|---|---|---|
| Anatase $TiO_2$ | 4.8-11.8 (W/(m * k)) | 3.89 (g/cm3) |
| Rutile $TiO_2$ | 4.8-11.8 (W/(m * k)) | 4.25 (g/cm3) |
| Haematite $Fe_2O_3$ | 6 (W/(m * k)) | 5.26 (g/cm3) |
| Corundum $Al_2O_3$ | 3.0-35 (W/(m * k)) | 3.99 (g/cm3) |
| Quartz $SiO_2$ | 18.37 (W/(m * k)) | 2.65 (g/cm3) |

During the tempering process the particle diameter of the substances produced has increased significantly and in this case the surface area is decreased. Thus within the primary crystals the conductivity also increased to values which are set out in Table 4. In principle, in crystal mixtures the phonons are reflected on the crystal boundaries with simultaneous reduction of the thermal conductivity, i.e. there is a causal relationship between crystal structures and thermal conductivity of a substance.

Air is still contained in the substance mixture and as a poor conductor of heat it lowers the measured thermal conductivity. In order to avoid this effect, different methods are possible, including for example application of pressure, i.e. pressing the substance to form solid bodies.

Furthermore, substances can be added, which prevent air inclusions between the crystallites or on the surface of the crystallites and thus enable the production of solid substance blocks.

These include for example:
metal colloids
metal powder
graphite
sinterable pyrolysing substances based on Si As well as the addition of the said substances, pressure and thermal energy can additionally be used.

It is crucial to be able to produce good heat conducting substance blocks. For the use of the substance obtained after the tempering as a heat storage means, a good thermal conductivity, in particular the prevention of air inclusions, is significant for the charging operation (heating of the substance) and for the discharging operation (transfer of the stored heat to systems which for example generate steam).

EXAMPLE

A mixture of the provided substance consisting of untempered substance and substance tempered up to 1,000° C. in the ratio of 1:1 is surface-modified with 5% PDMS (polydimethylsiloxane prepolymer) and is introduced into a BUSS kneader or a co-rotating double screw extruder. The compounding machine has a housing temperature of 135° C. and maximum vacuum degassing. The torque is set to 65-85% of the maximum. The material is removed by means of a cooling conveyor.

The resulting water-free and air-free product is introduced into the insulated container and is mechanically compressed. Then the temperature is slowly increased to 1,000° C. and thus the heat storage means is made ready for operation. Instead of PDMS, other substances can be used, such as metal dusts, graphite or salt solutions.

6. SUMMARY

After washing or neutralisation, bauxite residue/red mud which is largely free of alkali and alkaline earth is used as starting material. The objective is to obtain simple and clearly defined substance structures with clear parameters even after tempering to for example 1000° C. or higher temperatures.

During tempering up to temperatures of 1,000° C. all components within the substance mixture which are unstable in this temperature range decomposed. These include gibbsite, goethite, boehmite as well as cancrinite and the $TiO_2$ phases which, where applicable, form pseudobrookite [$(Fe^{3+})_2Ti)O_5$ and nepheline [$(Na,K) (AlSiO_4)$] at 1,000° C.

After the cooling, a substance mixture was formed, consisting of oxides such as $Al_2O_3$, $Fe_2O_3$, $TiO_2$, $SiO_2$ and optionally substances which are resistant to high temperatures, such as pseudobrookite and nepheline, which did not show any further change after renewed tempering to 1,000° C.

With the aforementioned change to the material composition the density also changed from 3.63 (g/cm$^3$) at room temperature to 3.93 (g/cm$^3$) at 1,000° C. This expected operation was additionally accompanied by sintering effects. During cooling of the substance mixture tempered to 1,000° C., the density reached at 1,000° C. remains unchanged, since the density of oxides such as $Al_2O_3$, $Fe_2O_3$ as well as $TiO_2$ and $SiO_2$ does not change in the temperature ranges between 25° C. and 1,000° C.

These sintering effects and the decomposition of mineral phases have led to an increase in the particle diameter in the substance mixture. Whereas before the tempering for example $d_{50}$=0.261 μm and $d_{90}$=1.692 μm applied, after the tempering the following values could be measured: $d_{50}$=6.743 μm and $d_{90}$=28.17 μm. The enlargement of the particles means a reduction of the surface and a better thermal conductivity. The air content (poor conductor of heat) between the very small crystallites was reduced.

The study of the specific thermal capacity of the characterised substance showed an increase in the specific thermal capacity of 0.79 (kJ/(kg K)) at 25° C. to 1.037 (kJ/(kg K)) at 600° C. At 1,000° C. a value of 1.14-1.18 (kJ/(kg K)) is to be expected by extrapolation.

Since, as already stated, the density has also increased, the product of the density and the specific thermal capacity as a crucial criterion for applications as heat storage means reaches values higher than that of water. Water has a density at 20° C. of 998.2 (kg/m$^3$) and an outstanding specific thermal capacity of 4.182 (kJ/(kg K)). This results in a volumetric thermal capacity of 4175 (kJ/(m$^3$ K)). On the other hand, the provided substance has a density of 3890 (kg/m$^3$) and a specific thermal capacity of 1.037 (kJ/(kg K)) and thus a volumetric thermal capacity of 4.034 (kJ/(m$^3$ K)) at approximately 600° C. At 1000° C. values for the density of 3,930 (kg/m$^3$) and a $c_p$ von 1.16 (kJ/(kg K)) are produced. Thus the volumetric thermal capacity reaches a value of 4.559 (kJ/(m$^3$ K)). This value significantly exceeds the value of water.

A substantial difference between water and the specified substance is the temperature at which the storage media can operate. Whilst water ideally operates in temperature ranges between 40° C. and 90° C., that is to say it has a ΔT of 50° C., the provided substance can operate in the temperature range up to 1,000° C., i.e. the substance can evaporate water above a temperature of 100° C. and thus can operate with a ΔT of 900° C. For this reason the provided substance can store 15-20 times as much heat by comparison with water (based on volume).

In storage media the coefficient of thermal conductivity is more important for the charging operation (heating up of the storage device) than for the discharging operation. The thermal conductivity of the oxides substantially contained in the substance is between 3 and 35 (W/(m K). What is crucial for heat storage means is the necessity of being able to compact the substance used as storage medium to form solid blocks in which the thermal power can flow optimally, i.e. from the heating element into the storage substance, within the storage substance and from the storage substance into the systems consuming thermal energy. In this respect it is advantageous if poorly heat-conducting gases within the substance or on the surface of the substance are eliminated. in addition to applications of pressure substances can be added by which the primary crystals are "stuck together". These include, for example, metal colloids, metal powder, graphite, sinterable pyrolysing substances containing Si. Above all, it is also crucial that in the tempering process of the provided substance up to 1,000° C. all unstable substances are decomposed and so a predominantly oxidic, thermally stable storage substance is made available which can be heated and cooled with any frequency without generating gases such as $H_2O$ or $CO_2$ which can destroy the storage block.

Charging and discharging of the heat storage means take place simultaneously at an arbitrary temperature or in a narrow temperature range. As a result a permanent change to the coefficients of thermal expansion is prevented and the thermal shock behaviour and the thermal cycling behaviour is stabilised in the sense of a long service life expectation of the energy storage device.

Use of the Provided Substance as Storage Material for High-Temperature-Heat Storage Means The Storage System Both water and also solid substances—for example the previously described substance—belong to the sensitive heat storage systems (sensitive, because the heat of the storage device is perceptible).

The heat storage means can be heated by means of force/heat coupling by electrical power from wind farms or solar installations. In still air or in darkness these heat storage means can for example generate steam which drives turbines which in turn generate electrical power (cogeneration by heat/force coupling) by means of generators connected downstream. Thus the heat storage means takes on the role of emergency generator or, on a large scale, of "replacement power plants". If this process is successful, the power line systems can also be simply and effectively designed.

The requirements for energy accumulators are set out below:
High energy density
High power density
Low cumulative energy consumption
Low losses
Low self-discharge
Long cycle life
Long service life
Low investment costs
Low operating costs The provided substance meets the set requirements to a large extent.

The substance is
inorganic
safe
with a long service life
recyclable
available in very large quantities
highly economical
operates in the temperature range up to 1,000° C.
can be simultaneously charged and discharged
can be simply manufactured.

In particular the fact that, as a sensitive high-temperature storage means, the provided substance can be simultaneously charged and discharged makes it possible to operate a controllable, permanently running storage power plant. In this way power generation deficiencies can be compensated for or higher demands can be met.

Furthermore heat storage means can be used in particular for wind farms or solar parks and thus render the power generated there capable of providing base load power as a "package solution".

Furthermore, small heat storage units can be used for example for a complete power supply for example for residential buildings. These small units are heated for example by renewable energy sources and are then used as a routine replacement for the complete power supply, i.e. supply of thermal power and electricity, for residential buildings.

Furthermore, small heat storage units in machines of all types can be used for the purpose of power supply.

Furthermore, after cogeneration, electrical power can be made "transportable" in the form of heat storage means without line systems.

Vehicles can also be powered in this way. After cogeneration by heat/power coupling has taken place, heat storage means which are regularly replaced like batteries can operate electric motors, comparably to lithium batteries.

The equipment for the conversion of heat into electrical power can be provided as an integral component of the storage device take place or in units which are independent thereof.

EXAMPLE

The provided substance is a filter cake which first of all must be subjected to a thermal treatment, i.e. it must be heated slowly up to 1,000° C. In this case first of all the water content of the filter cake is evaporated, then up to 1,000° C. all minerals which are unstable in the high-temperature range are calcined. Then the substance consists only of oxides as well as stable inorganic phases such as nepheline or others. This substance is cooled and forms the storage mass.

The charging (i.e. heating) of the storage mass takes place directly by means of embedded resistance wires or heating elements, i.e. resistance wires in ceramic sleeves or other systems. By means of corresponding control devices the storage mass can be constantly adjusted to arbitrary temperatures.

The discharging takes place by means of a water circulation which passes through the storage mass at a suitable and optimal point of the temperature range/steam pressure. Water is evaporated, steam drives turbines, current is generated. The excess steam is guided back again into the water circulation by means of cooling equipment ("cooling tower").

Optimal conditions can be set by means of the specific thermal conduction of the heat storage medium between the delivery of heat (hottest point) and the heat consumption.

The heat storage material is consolidated with heating means for the supply of heat and the pipe system (water) for the heat dissipation to form a block. This block is thermally insulated against the exterior.

The statement that the heat storage system characterised in this way can be simultaneously charged and discharged is crucial. As a rule storage facilities are designed so that either charging or discharging takes place; cf. in this connection pumped storage facilities. On the other hand, with the possibility of the simultaneous charging by renewable energy sources and the discharging it is possible to construct stable storage power plants which are capable of providing base load power.

Currently the most important heat storage system for sensitive heat storage means is water. This system is characterised in that it operates with water ideally in a temperature range from 40°-90° C., since above 100° C. water is present as steam. Thus water has a ΔT von 50° C.

In contrast to this, the heat storage system which operates with a storage mass which has been produced from the provided substance can operate at temperatures up to 1,000° C., i.e. the substance can evaporate water above a temperature of 100° C. and thus can operate with a ΔT of 900° C. Thus this system is a high-temperature storage system.

EXAMPLE

Comparison of the Sensitive Water/ALFERROCK® Heat Storage Means

Calculation of the Amount of Heat which can be Stored

The amount of heat Q which a storage material can store is calculated according to the following equation:

$$Q = m * c_p * \Delta T = \rho * c_p * V * \Delta T \ [J]$$

$m$ = mass [kg]

$c_p$ = specific thermal capacity $\left[\frac{kJ}{kg \ K}\right]$ $\rho$ = density $\left[\frac{kg}{m3}\right]$ $V$ = volume $[m^3]$ $\rho * c_p$ = volumetric thermal capacity $\left[\frac{kJ}{m3 \ K}\right]$ $\Delta T$ = temperature range $[K]$ $Q_{(1m^3)}$ = volumetric thermal capaticy $* \Delta T \ [J]$ 1. Water (for 1 m³)

$$\rho = 998.2 \left[\frac{kg}{m3}\right]$$

$$c_p = 4.182 \left[\frac{kJ}{kg \ K}\right]$$

$$\rho * c_p = 4,175 \left[\frac{kJ}{m3 \ K}\right]$$

$$\Delta T = 50 \ K$$

$$Q = 4,175 \left[\frac{kJ}{m3 \ K}\right] * 50 \ K * 1 \ m^3$$

$$Q = 208.7 * 10^3 \ kJ$$

Converted into Wh:
1 J=1 Wh/3600
$Q_{water}$=57.88 kWh

2. ALFERROCK® (for 1 m³)

$$\rho = 3,930 \left[\frac{kg}{m3}\right]$$

$$c_p = 1.16 \left[\frac{kJ}{kg \ K}\right]$$

$$\rho * c_p = 4,558.8 \left[\frac{kJ}{m3 \ K}\right]$$

$$\Delta T = 900 \ K$$

$$Q = 4,558.8 \left[\frac{kJ}{m3 \ K}\right] * 900 \ K * 1 \ m^3$$

$$Q = 4,102.9 * 10^3 \ kJ$$

Converted into Wh:
1 J=1 Wh/3600
QALFERROCK®=1.1397 MWh

3. Comparison ALFERROCK®/water $$\frac{Q \ ALFERROCK}{Q \ water} = \frac{1.1397 \ MWh}{57.88 \ kWh} = 19.7$$

ALFERROCK® can store 19.7 times the amount of heat at an operating temperature up to 1,000° C.

The ALFERROCK® high-temperature heat storage medium can also be used in an outstanding manner at lower temperatures as a heat storage means, heat exchanger and thermostat. It is worthy of note that during tempering of the provided substance the increase in the density from $$3.63 \frac{g}{cm3}$$

at 100° C. to $$3.93 \frac{g}{cm3}$$

at 1,000° C. does not decline, but remains constant at $$3.93 \frac{g}{cm3}.$$

Thus the value ρ*$c_p$ is increased by 9%.

In the following Table 5 the storable quantities of heat in the region of approximately 200° C., 300° C., 400° C., 500° C. and 600° C. are set out and present very attractive values.

TABLE 5

Requirements for energy accumulators

| Temperature [° C.] | $C_p$ $\left[\frac{kJ}{kg\,K}\right]$ | Density ρ [kg/m³] | $\rho * cp * V$ $\left[10^6 \frac{J}{K}\right]$ | ΔT [K] | Q (for 1 m³) [J] |
|---|---|---|---|---|---|
| 208.32 | 0.928 | 3930 | 3.65 | 100 | 365 * 10⁶ |
| 307.26 | 0.960 | 3930 | 3.77 | 200 | 754 * 10⁶ |
| 406.17 | 0.989 | 3930 | 3.88 | 300 | 1.16 * 10⁹ |
| 505.07 | 1.020 | 3930 | 4.01 | 400 | 1.60 * 10⁹ |
| 584.20 | 1.037 | 3930 | 4.08 | 500 | 2.04 * 10⁹ |

The invention claimed is:

1. A modified red mud comprising:
   haematite;
   corundum;
   rutile and/or anatase;
   quartz;
   perovskite;
   pseudobrookite and nepheline; and
   less than 0.5% by weight of $Na_2O$ and/or glass;
   wherein the modified red mud has a density in the range from 3.90 to 4.0 g/cm³.

2. The modified red mud of claim 1 comprising:
   48 to 55% by weight of haematite;
   13 to 18% by weight of corundum;
   8 to 12% by weight of rutile and/or anatase;
   2 to 5% by weight of quartz; and
   less than 0.03% by weight of $Na_2O$ and/or less than 0.1% by weight of glass.

3. The modified red mud of claim 1, wherein the modified red mud contains less than 0.5% by weight of aluminium titanate, iron, mayenite, ulvospinell, and/or andradite.

4. The modified red mud of claim 1, wherein the modified red mud has a porosity of less than 15%.

5. The modified red mud of claim 1, wherein the modified red mud has a density of approximately 3.93 g/cm³.

6. The modified red mud of claim 1, wherein the modified red mud has a mean particle size d50 in the range from 3 to 10 μm.

7. The modified red mud of claim 1, wherein the modified red mud has a specific thermal capacity at 20° C. in the range from 0.6 to 0.8 kJ/(kg·K) and/or a specific thermal capacity at 726.8° C. in the range from 0.9 to 1.3 kJ/(kg·K).

8. The modified red mud of claim 1, wherein the modified red mud has a specific thermal conductivity in the range from 3 to 35 W/(m·K).

9. The modified red mud of claim 1 further comprising one or more of the following components:
   an agent for preventing inclusion of air and air adsorption;
   an agent for improvement of the thermal conductivity; and
   an agent for formation of a thixotropic composition.

10. The modified red mud of claim 1, wherein the modified red mud is capable of use as an energy storage medium that can be repeatedly heated and cooled.

11. A method of producing a modified red mud comprising:
    heating a red mud to a temperature of at least 800° C., wherein the red mud has a mineral composition comprising:
    10 to 55% by weight of iron compounds;
    12 to 35% by weight of aluminium compounds;
    3 to 17% by weight of silicon compounds;
    2 to 12% by weight of titanium dioxide;
    0.5 to 6% by weight of calcium compounds; and
    less than 0.5% by weight of $Na_2O$;
    wherein the modified red mud has a density in the range from 3.90 to 4.0 g/cm³; and
    wherein the modified red mud further comprises perovskite, pseudobrookite and nepheline.

12. The method of claim 11 further comprising washing and drying the red mud using iron(II)chloride prior to heating the red mud.

13. The method of claim 11 further comprising:
    granulating the red mud after the heating; and
    subsequently compressing the granulate.

14. The method of claim 11, wherein heating the red mud comprises heating the red mud in a non-reducing atmosphere.

15. A method of storing energy comprising:
    repeatedly heating and cooling a modified red mud that comprises the following components:
    haematite;
    corundum;
    rutile and/or anatase;
    quartz;
    perovskite;
    pseudobrookite and nepheline; and
    less than 0.5% by weight of $Na_2O$ and/or glass;
    wherein the modified red mud has a density in the range from 3.90 to 4.0 g/cm³.

16. The method of claim 15 further comprising storing heat energy within the modified red mud at a temperature of more than 100° C. and up to 1000° C.

17. The method of claim 15 further comprising simultaneously heating and cooling the modified red mud.

18. The method of claim 15 further comprising heating the modified red mud by means of electrical current and/or cooling the modified red mud while electrical current is generated.

19. The method of claim 18 further comprising heating the modified red mud by means of electrical power obtained from at least one renewable energy source.

20. The method of claim 18 further comprising heating the modified red mud by applying electrical current to resistance wires located within the modified red mud.

21. The method of claim 18 further comprising cooling the modified red mud by transferring thermal power stored in the modified red mud to another medium, wherein the another medium comprises one of water, steam, molten salt, thermal oil, and gas.

* * * * *